(12) United States Patent
Lee et al.

(10) Patent No.: US 9,838,710 B2
(45) Date of Patent: Dec. 5, 2017

(54) MOTION ESTIMATION FOR ARBITRARY SHAPES

(71) Applicant: Intel Corporation, Santa Clara, CA (US)

(72) Inventors: Sang-Hee Lee, Santa Clara, CA (US); James M. Holland, Folsom, CA (US); Lidong Xu, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 14/580,931

(22) Filed: Dec. 23, 2014

(65) Prior Publication Data

US 2016/0182915 A1 Jun. 23, 2016

(51) Int. Cl.
*H04N 7/12* (2006.01)
*G06K 9/00* (2006.01)
*H04N 19/513* (2014.01)
*H04N 19/543* (2014.01)

(52) U.S. Cl.
CPC ......... *H04N 19/521* (2014.11); *H04N 19/543* (2014.11)

(58) Field of Classification Search
CPC ............................ H04N 19/521; H04N 19/543
See application file for complete search history.

(56) References Cited

U.S. PATENT DOCUMENTS

| 6,996,182 | B2 * | 2/2006 | Ma ........................ G06T 7/2026 |
| | | | 348/699 |
| 8,023,562 | B2 | 9/2011 | Zheludkov et al. |
| 8,908,768 | B2 | 12/2014 | Hsu et al. |
| 2001/0026590 | A1 * | 10/2001 | Kang ...................... H04N 5/145 |
| | | | 375/240.16 |
| 2007/0183504 | A1 * | 8/2007 | Hoffman ............... G06T 7/2013 |
| | | | 375/240.16 |
| 2013/0301732 | A1 * | 11/2013 | Hsu ....................... H04N 19/136 |
| | | | 375/240.16 |
| 2015/0181219 | A1 * | 6/2015 | Lin ........................ H04N 19/56 |
| | | | 375/240.16 |
| 2015/0382012 | A1 * | 12/2015 | Hussain ............... H04N 19/176 |
| | | | 375/240.16 |
| 2016/0021385 | A1 * | 1/2016 | Chou ................... H04N 19/513 |
| | | | 375/240.16 |

FOREIGN PATENT DOCUMENTS

| CA | EP 2343898 A1 * | 7/2011 | ............. H04N 19/56 |
| EP | 2343898 | 7/2011 | |

OTHER PUBLICATIONS

International Search Report and Written Opinion for International Patent Application No. PCT/US2015/061884, dated Mar. 15, 2016.

* cited by examiner

*Primary Examiner* — Tsion B Owens
(74) *Attorney, Agent, or Firm* — Green, Howard & Mughal, LLP

(57) ABSTRACT

Techniques related to providing motion estimation for arbitrary pixel block shapes are discussed. Such techniques may include generating a distortion mesh for a pixel block based on multiple calls to a motion estimation such that the distortion mesh includes distortion values associated with regions of the pixel block, a seed motion vector, and candidate motion vectors, and determining a best motion vector for the pixel block based on the distortion mesh.

23 Claims, 9 Drawing Sheets

MOTION ESTIMATION FOR ARBITRARY SHAPES

BACKGROUND

A video encoder compresses video information so that more information can be sent over a given bandwidth or saved in a given file size. The compressed signal or file may be transmitted to a receiver or video decoder that may decode or decompress the signal or file for display to a user. Such video encoder-decoder systems may follow a format or standard. For example, video compression standards include the H.264/MPEG-4 Advanced Video Coding (AVC) standard, the High Efficiency Video Coding (HEVC) standard, and the VP9 standard. Such standards may include basic functional modules such as intra/inter-prediction, transform, quantization, in-loop filtering, and entropy coding. For example, HEVC, the successor to AVC jointly developed by ISO/IEC (International Organization for Standardization/International Electrotechnical Commission) and ITU-T (ITU Telecommunication Standardization Sector) and publicized in 2013 may double the compression ratio as compared to AVC at the same level of visual quality. Forthcoming UHD and 8 k UHD are expected to be largely implemented based on HEVC. Furthermore, lower resolution content currently encoded largely based on AVC are expected to move to HEVC encoding. VP9 is a direct competitor to HEVC.

As discussed, an aspect of video encoding may include inter-prediction, which may include motion estimation. Motion estimation may include determining motion vectors that describe the transformation from one image such as a frame of video to another image such as a subsequent frame of video. In some examples, motion estimation may include block matching based motion estimation such that motion vectors are associated with pixel blocks (or similar portions of pixels such as coding units or the like) of a frame. Such motion vectors may be encoded and provided to a decoder, which may perform motion compensation for video frames based on the decoded motion vectors to generate decoded video frames. Furthermore, such motion vectors may be used locally by a video encoder to perform motion compensation within a local decode loop for the eventual generation and encoding of residuals (e.g., differences between decoded pixel blocks and source pixel blocks), which may also be provided to a decoder.

Further still, such motion estimation techniques may support other applications in addition to encoding and decoding applications. For example, motion estimation techniques, or, more generally, block matching search techniques may be implemented in gesture tracking applications, image stabilization applications, or the like.

In some motion estimation contexts, the size of pixel blocks associated with an individual motion vector may be increasing. For example, in H.264, 16×16 macroblocks may be associated with an individual motion vector and in HEVC and VP9, up to 64×64 coding units may be associated with an individual motion vector. For example, motion estimation may include a search performed for a pixel block of a current frame based on a search area or window of a reference frame or frames. Support of such larger pixel blocks may reduce the number of coded bits as compared to smaller pixel blocks. However, as pixel block sizes increase, such pixel block searching may cause increased computational costs as the complexity in hardware implementations and memory trafficking increase.

It is with respect to these and other considerations that the present improvements have been needed. Such improvements may become critical as the desire to compress high quality video, perform gesture tracking, provide image stabilization, and the like becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
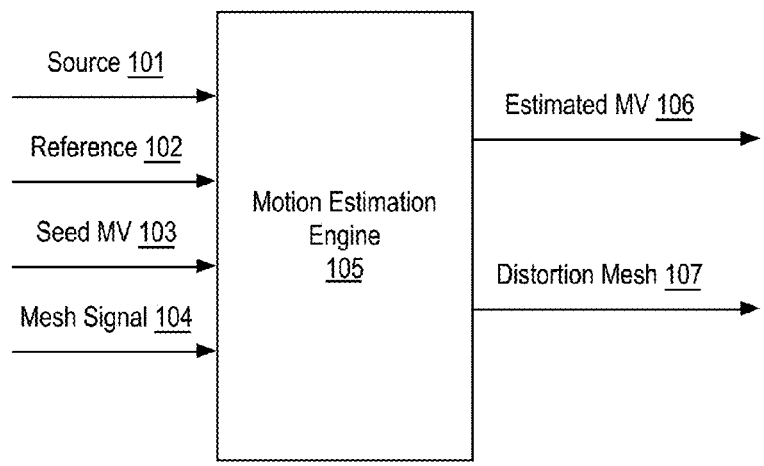
FIG. 1 is a block diagram illustrating an example device including an example motion estimation engine.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to motion estimation and, in particular, to generating a distortion mesh for a pixel block and determining a best motion vector for the pixel block based on the generated distortion mesh.

As described above, in some contexts, motion estimation may now be performed based on larger pixel blocks as compared to previous standards. Such larger pixel blocks may provide difficulties in implementing pixel block searching and, in particular, in implementing pixel block searching in hardware. For example, the use of larger pixel blocks may substantially increase the complexity of the implementation logic circuitry and memory trafficking. As is discussed further herein, the described techniques may mitigate or eliminate such difficulties. Furthermore, in contexts where standard or smaller pixel block are implemented, the described techniques may offer advantages such as faster processing and/or ease of implementation or the like. As such, the techniques and systems discussed herein are not limited to any particular pixel block size Furthermore, such motion estimation techniques may be applied to a pixel block of any shape. For example, in standard contexts, pixel blocks may be square shaped. However, using the techniques discussed herein, motion estimation may be applied to pixel blocks of any shape.

For example, in some embodiments, a pixel block may be split or divided into two or more regions and a seed motion vector may be generated for the pixel block. For example, the seed motion vector may be generated via a call to a motion estimation engine based on a downsampled version of the pixel block such that the resulting motion vector is mapped to the resolution of the pixel block. A distortion mesh may then be generated based on the regions of the pixel block and multiple candidate motion vectors adjacent to and, in some examples, surrounding the seed motion vector. For example, a call may be made to a motion estimation engine for a region of the pixel block (e.g., by providing a source pixel block associated with the region of the pixel block) and the motion estimation engine may provide a distortion mesh or array including a distortion for each of the candidate motion vectors (including the seed motion vector in some examples). Multiple calls may be made to the motion estimation engine (e.g. by providing source pixel blocks associated with the other regions) to generate a full distortion mesh including a distortion value for each combination of regions and candidate motion vectors. Based on the full distortion mesh, a best motion vector from the candidate motion vectors may be determined. For example, the best motion vector may be associated with a minimum distortion summation value such that distortion summation values are generated for each candidate motion vector and the seed motion vector.

In some examples, the best motion vector may be used for subsequent processing (e.g., video encoding, gesture or motion tracking, or image stabilization, or the like). In other examples, the best motion vector may be used in a subsequent group of calls to a motion estimation engine to determine a higher resolution best motion vector for the pixel block, which may then be used for subsequent processing. For example, if the first best motion vector is an integer resolution best motion vector, the subsequent best motion vector may be a half pel resolution best motion vector and if the first best motion vector is a half pel resolution best motion vector, the subsequent best motion vector may be a quarter pel resolution best motion vector, and so on. For example, processing may be repeated to attain more accurate best motion vectors.

Such processing may improve motion estimation efficiency (and coding efficiency in video encoding contexts such as HEVC or VP9) with reduced hardware costs or computational costs. For example, as is discussed further herein, such processing may perform motion estimation on a 2N×2N pixel block using an N×N block based motion estimation engine. For example, the 2N×2N pixel block may be split into four N×N regions. Hardware calls may be performed for each of the four N×N regions based on a seed motion vector (e.g., using the same seed motion vector for each of the four calls) to generate a distortion mesh and a best motion vector as discussed. Such processing may thereby provide efficient generation of a 2N×2N pixel block using a N×N block based motion estimation engine, which may save computation complexity and power or the like.

FIG. 1 is a block diagram illustrating an example device 100 including an example motion estimation engine 105, arranged in accordance with at least some implementations of the present disclosure. As shown in FIG. 1, motion estimation engine 105 may receive a source pixel block (source) 101, a reference pixel area (reference) 102, a seed motion vector (seed MV) 103, and/or a mesh enable/disable signal (mesh signal) 104 and motion estimation engine 105 may provide an estimated motion vector (estimated MV) 106 and/or a distortion mesh 107. Motion estimation engine 105 may be implemented via any suitable device 100 such as a computer, laptop computer, tablet, smart phone, camera, gaming device, or the like as is discussed further herein with respect to device 500, system 1400, and device 1500. In some examples, source pixel block 101, reference pixel area 102, seed motion vector 103, and mesh enable/disable signal 104 may be provided to motion estimation engine 105 as a call such as a command call or the like.

Motion estimation engine 105 may include any suitable hardware, firmware, software, or combination thereof for generating estimated motion vector 106 and/or a distortion mesh 107 based on source pixel block 101, reference pixel area 102, seed motion vector 103, and/or a mesh enable/disable signal 104. In some examples, motion estimation engine 105 may be provided in hardware such as via hardware of a graphics processing unit. In some examples, motion estimation engine 105 may be block based hardware capable of processing arbitrary shapes. Furthermore, in some examples, motion estimation engine 105 may process on a limited size of source pixel block 101. The size limitation may be any suitable size limitation based on the number of pixels of source pixel block 101, dimensions of source pixel block 101, or the like. In some examples, the size limitation of source pixel block 101 may be 256 pixels or a dimension of 16×16 pixels, or the like. However, as discussed, motion estimation engine 105 may have any such size limitation (e.g., a 32×32 size limitation) or no such size limitation.

For example, when mesh enable/disable signal 104 is enabled, motion estimation engine 105 may generate distortion mesh 107 based on source pixel block 101, reference pixel area 102, and candidate motion vectors associated with seed motion vector 103. Seed motion vector 103 may be generated using any suitable technique or techniques such as those discussed herein and seed motion vector 103 may represent a low resolution motion vector, best guess motion vector, first guess motion vector, estimated motion vector, or the like for source pixel block 101. In some examples, seed motion vector 103 may be generated based on an earlier call to motion estimation engine 105 for a downsampled source pixel block 101 and downsampled reference pixel area as estimated motion vector 106 such that seed motion vector may be a scaled or mapped representation of estimated motion vector 106 for the full resolution of source pixel block 101 and reference pixel area 102.

As discussed herein, source pixel block 101 may have any size and shape. Furthermore, source pixel block 101 may include any suitable data or data structure representing a block of pixels such as luma data, chroma data, or the like. Similarly, reference pixel area 102 may include any suitable data or data structure representing a reference area of pixels such as luma data, chroma data, or the like. Source pixel block 101 may, for example, be a portion of a frame currently being processed via motion estimation techniques and reference pixel area 102 may be a portion of a previous frame or previously processed frame and may provide a basis for processing the current frame. For example, the previously processed frame may be a temporally previous frame, a temporally subsequent frame, a combination of such frames, a synthesized or otherwise processed frame, or the like. Reference pixel area 102 may be larger than source pixel block 101 as various portions of reference pixel area 102 may be searched using candidate motion vectors based on source pixel block 101.

Distortion mesh 107 may be generated based on seed motion vector 103 and candidate motion vectors associated with seed motion vector 103. For example, distortion mesh 107 may include a distortion value for each of the candidate motion vectors (e.g., including seed motion vector 103) such that the distortion value is generated based on source pixel block 101 and reference pixel area 102. For example, when mesh enable/disable signal 104 is triggered, motion estimation engine 105 may take seed motion vector 103 as an input, in addition to source pixel block 101 and reference pixel area 102 inputs, and motion estimation engine 105 may output distortion mesh 107 including a distortion value for each of a plurality of candidate motion vectors. The distortion values of distortion mesh 107 may include any suitable distortion values as discussed further herein.

When mesh enable/disable signal 104 is disabled, motion estimation engine 105 may generate estimated motion vector 106. In some examples, when mesh enable/disable signal 104 is disabled, no seed motion vector 103 may be provided and the area of reference pixel area 102 may be increased to provide a lager search area for the generation of estimated motion vector 106. For example, estimated motion vector 106 may be generated based on a distortion mesh similar to distortion mesh 107, used internally by motion estimation engine 105 such that estimated motion vector 106 may be associated with a minimum distortion value of the distortion values of distortion mesh 107. Furthermore, when mesh enable/disable signal 104 is enabled, estimated motion vector 106 may be provided in some implementations.

As discussed, distortion mesh 107 may be generated based on candidate motion vectors associated with seed motion vector 103. In some examples, the candidate motion vectors associated with seed motion vector 103 may be motion vectors surrounding and adjacent to seed motion vector 103.

Figure 2:
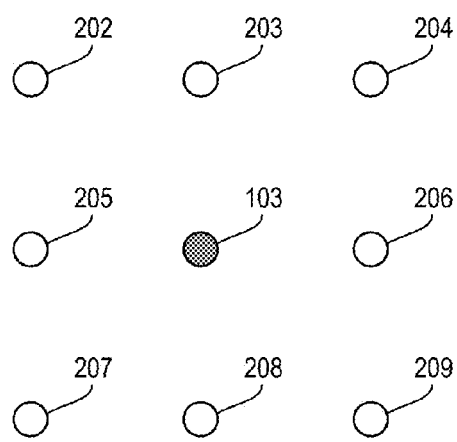
FIG. 2 illustrates example seed motion vector and example candidate motion vectors.

FIG. 2 illustrates example seed motion vector 103 and example candidate motion vectors 202-209, arranged in accordance with at least some implementations of the present disclosure. As shown in FIG. 2, candidate motion vectors 202-209 may be adjacent to and surrounding seed motion vector 103. In the illustrated example, candidate motion vectors 202-209 are above and to the left of seed motion vector 103, above seed motion vector 103, above and to the right of seed motion vector 103, right of seed motion vector 103, below and right of seed motion vector 103, below seed motion vector 103, below and to the left of seed motion vector 103, and left of seed motion vector 103, respectively. Furthermore, seed motion vector 103 may be a candidate motion vector as the term is used herein.

In the illustrated example, 8 additional candidate motion vectors 202-209 are shown in the layout described. However, any number of additional candidate motion vectors may be used in any suitable layout. For example, 2 or 4 candidate motion vectors may be used (above and below, left and right, in a diamond shape, or in a square shape, or the like) or additional candidate motion vectors in one or more layers around candidate motion vectors 202-209 (e.g., either full layer(s) or select portions of such layer(s)) may be used.

Furthermore, candidate motion vectors 202-209 may be provided at any accuracy around seed motion vector 103. In some examples, candidate motion vectors 202-209 may be integer pixel locations (e.g., integer or full pel resolution) from seed motion vector 103. In such examples, distortion mesh 107 may be described as an integer distortion mesh. In other examples, candidate motion vectors 202-209 may be half pixel locations (e.g., half pel resolution) or quarter pixel locations (e.g., quarter pel resolution) from seed motion vector 103. In such examples, distortion mesh 107 may be described as a fractional distortion mesh or a fraction motion estimation mesh or the like.

In some examples, the resolution of candidate motion vectors 202-209 may be requested via a call to motion estimation engine 105. For example, the resolution may be requested based on an explicit call request or based on an indication of the resolution of seed motion vector 103. In some examples, candidate motion vectors 202-209 may be generated based on twice the resolution of seed motion vector 103 (e.g., with an accuracy using half the pixel distance used to generate seed motion vector 103). For example, if seed motion vector 103 is an integer motion vector, candidate motion vectors 202-209 may be half pel distances from seed motion vector 103 and if seed motion vector 103 is a half pel motion vector, candidate motion vectors 202-209 may be quarter pel distances from seed motion vector 103, and so on. For illustrative purposes, consider an integer seed motion vector 103 having a value of MVx=5, MVy=2. In such an example, candidate motion vectors 202-209 may be provided as the 8 half pel motion vectors closest to seed motion vector 103 having values of MVx=5+(0,−0.5,0.5), MVy=2+(0,−0.5,0.5). Similarly, assuming a half pel motion vector 103 having a value of MVx=5, MVy=2.5, candidate motion vectors 202-209 may be provided as the 8 quarter pel motion vectors closest to seed motion vector 103 having values of MVx=5+(0,−0.25, 0.25), MVy=2.5+(0,−0.25,0.25).

As discussed, in other examples, the accuracy or resolution of candidate motion vectors 202-209 may be the same as the accuracy or resolution of seed motion vector 103. In particular, in integer distortion mesh implementations, candidate motion vectors 202-209 and seed motion vector 103 may both be integer motion vectors. Furthermore, as discussed, the candidate motion vectors evaluated via motion estimation engine 105 is not limited to 9 motion vectors (e.g., seed motion vector 103 and candidate motion vectors 202-209). For example, the candidate motion vectors may be extended further to cover a wider range of neighboring motion vectors.

As discussed, and with reference to FIG. 1, distortion mesh 107 may be generated based on source pixel block 101, reference pixel area 102, and seed motion vector 103 (and candidate motion vectors associated with seed motion vector 103. In some examples, distortion mesh 107 may include a plurality of distortion values associated with source pixel block 101, reference pixel area 102, and seed motion vector 103.

Figures 3, 4:
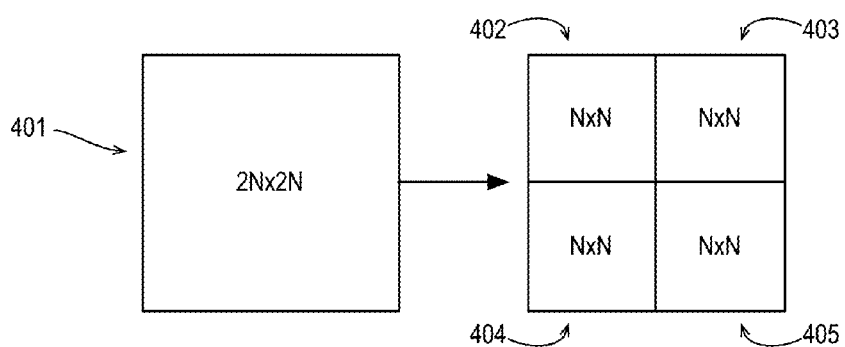
FIG. 3 illustrates example distortion mesh.
FIG. 4 illustrates an example pixel block.

FIG. 3 illustrates example distortion mesh 107, arranged in accordance with at least some implementations of the present disclosure. As shown in FIG. 3, distortion mesh 107 may include an array of distortion values 304 associated with source pixel block 101, reference pixel area 102, and seed motion vector 103. For example, each of distortion values 304 (D1,1-D9,1) may be associated with or generated based on source pixel block 101, which is represented as source pixel block (B1) 302 in FIG. 3 and a motion vector of candidate motion vectors 202-209 and seed motion vector 103, which are represented as candidate motion vectors (MV1-MV9) 301 in FIG. 3. In the illustrated example of FIG. 3, distortion values 304 are labeled as DX,Y such that X represents the associated motion vector of candidate motion vectors 301 and Y represents the associated source pixel block of pixel block 302 (e.g., including only one pixel block in this example).

Distortion mesh 107 may be or may include any suitable data structure for representing distortion values 304. In some examples, distortion mesh 107 may include only distortion values 304 (e.g., such that the source pixel block and motion vector associations may be known based on a predefined standard or the like). In some examples, distortion mesh 107 may be provided as an array of distortion values 304. Furthermore, distortion values 304 may be of any suitable type and precision.

Distortion values 304 may include any suitable distortion values or metrics associated with source pixel block 101 and reference pixel area 102. In some examples, distortion values 304 may be motion compensated distortion values based on source pixel block 101 and reference pixel area 102. For example, distortion values 304 may be motion compensated distortion values based on source pixel block 101 and reference pixel area 102 determined using any suitable technique or technique such as a sum of squared error values, a mean of squared error values, a sum of absolute error values, a mean of absolute error values, or the like.

As discussed and with reference to FIG. 1, in some examples, source pixel block 101 may represent or be a region or portion or sub-block of a larger pixel block. For example, motion estimation engine 105 may be called or invoked multiple times for regions of a pixel block to generate a distortion mesh associated with multiple regions of the pixel block. As used herein, the term source pixel block may represent a pixel block provided to motion estimation engine 105 for processing. As is discussed further herein, a best motion vector may be determined for the pixel block based on the distortion mesh generated using such multiple calls for regions of the pixel block.

FIG. 4 illustrates an example pixel block 401, arranged in accordance with at least some implementations of the present disclosure. As shown in FIG. 4, pixel block 401 may include or be divided into four regions 402-405. Regions 402-405 may also be characterized as sub-blocks or sub-pixel blocks or the like. Furthermore, pixel block 401, in various contexts, may be characterized as a macroblock, a largest coding unit, a coding unit, a coding tree unit, a primitive, or the like. In the example illustrated in FIG. 4, pixel block 401 is a square 2N×2N pixel block, however, pixel block 401 may be any shape. Furthermore, in the illustrated example, regions 402-405 of pixel block 401 are square pixel blocks having a size of N×N pixels each. However, regions 402-405 may also be of any shape and of any size. In the example, N may be any suitable value. In some examples N may be 16. In other examples, N may be 4, 8, 32, or the like.

Furthermore, FIG. 4 illustrates pixel block 401 being divided into four equal regions 402-405. However, pixel block 401 may be divided into any number of regions such as 2 regions, 6, regions, 8 regions, or the like. Furthermore, in some examples, regions 402-405 may be different sizes or shapes as is discussed further herein with respect to FIG. 8. In an example, pixel block 401 may be 64×64 pixels and pixel block 401 may be divided into four 32×32 pixel regions. In another example, pixel block 401 may be 32×32 pixels and pixel block 401 may be divided into four 16×16 pixel regions. In yet another example, pixel block 401 may be 64×64 pixels and pixel block 401 may be divided into sixteen 16×16 pixel regions. In still another example, pixel block 401 may be 64×64 pixels and pixel block 401 may be divided into four 32×32 pixel regions.

As discussed, in some examples, motion estimation engine 105 may have a limitation as to the size of the source pixel block it may process based on a single process call. For example, motion estimation engine 105 may have a size limitation such that it may handle 16×16 or 32×32 source pixel blocks per processing call although the size limitation may be any suitable limitation depending on implementation details. Furthermore, in some examples, motion estimation engine 105 may not have a size limitation but due to other processing concerns, it may be advantageous to process a pixel block on a region by region basis via a motion estimation engine such as motion estimation engine 105.

Figure 5:
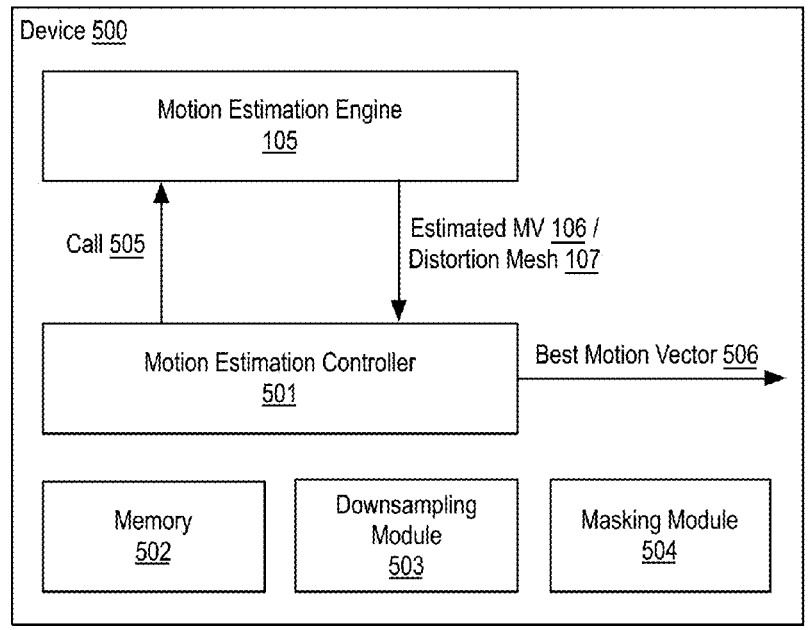
FIG. 5 illustrates an example device for providing motion estimation.

Turning now to FIG. 5, FIG. 5 illustrates an example device 500 for providing motion estimation, arranged in accordance with at least some implementations of the present disclosure. As shown in FIG. 5, device 500 may include motion estimation engine 105, a motion estimation controller 501, a memory 502, a downsampling module 503, and a masking module 504. Downsampling module 503 and masking module 504 are discussed further herein below. Furthermore, device 500 may include any number of motion estimation engines such that serial or parallel processing may be provided. Also, as discussed with respect to motion estimation engine 105, motion estimation engine 105 may process in a mesh enable or a mesh disable mode. In some examples, device 500 may include motion estimation engines capable of only processing mesh requests or only processing mesh disable requests (e.g., requests for estimated motion vectors). As shown, motion estimation controller 501 may provide a call 505 to motion estimation engine 105. Call 505 may include any suitable information to invoke motion estimation engine such as source pixel block 101, reference pixel area 102, seed motion vector 103, and mesh enable/disable signal 104 as discussed herein.

For example, motion estimation controller 501 may receive an image frame for processing and/or partition information for the image frame. The partition information may partition the image frame into pixel blocks or candidate pixel blocks or the like. Motion estimation controller 501 may generate a pixel blocks, regions, and source pixel block based on the image frame and/or partition information. For example, if a pixel block may be processed or is to be processed in whole via motion estimation engine 105, motion estimation controller 501 may provide the pixel block as source pixel 101 with mesh enable/disable signal 104 disabled such that motion estimation engine 105 may return estimated motion vector 106 for the pixel block.

If a pixel block may not be processed or is not to be processed in whole via motion estimation engine 105 (e.g., because motion estimation engine 105 cannot handle that large of a block or due to other processing constraints or the like), motion estimation controller 501 may divide the pixel block into regions (e.g., please refer to FIG. 4) and may make multiple calls to motion estimation engine 105 with the same seed motion vector such that a region is provided for each call as a source pixel region and mesh enable/disable signal 104 is enabled. In such examples, motion estimation controller 501 may receive distortion mesh 107 for each region of the pixel block. For example, distortion mesh 107 for each region of the pixel block may be provided as described with respect to FIG. 3.

Motion estimation controller 501 may combine such distortion meshes to generate a distortion mesh for the pixel block. For example, array distortion meshes as discussed with respect to FIG. 3 may be received for each region 402 of pixel block 401 (please see FIG. 4). Such array distortion meshes may be combined to generate a grid distortion mesh for the pixel block.

Figure 6:
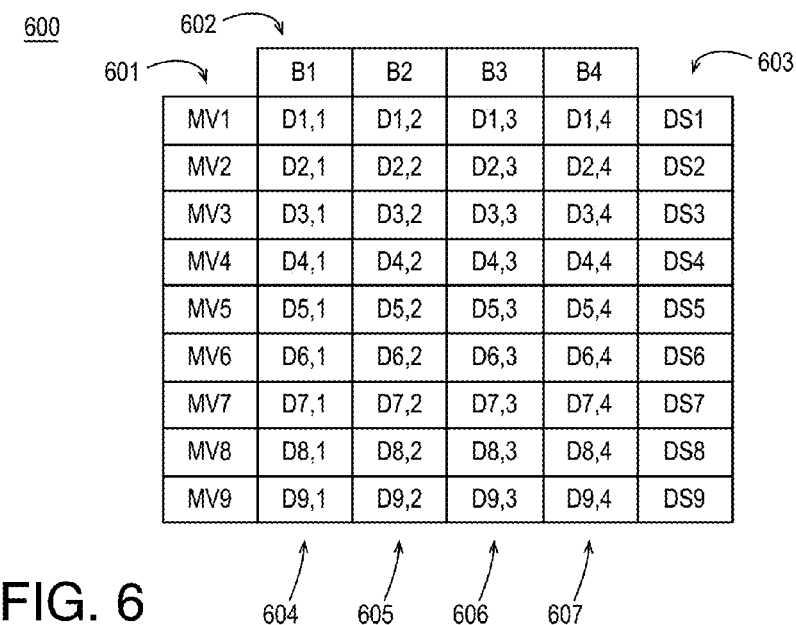
FIG. 6 illustrates example distortion mesh.

FIG. 6 illustrates example distortion mesh 600, arranged in accordance with at least some implementations of the present disclosure. As shown in FIG. 6, distortion mesh 600 may include a grid of distortion values 604-607 associated with source pixel blocks 602 (B1-B4), a reference pixel area, and candidate motion vectors 601 based on and including a seed motion vector. For example, each of distortion values 604 (D1,1-D9,1) may be associated with or generated based on region 402 of source block 401, each of distortion values 604 (D1,2-D9,2) may be associated with or generated based on region 403 of source block 401, each of distortion values 604 (D1,3-D9,3) may be associated with or generated based on region 404 of source block 401, and each of distortion values 604 (D1,4-D9,4) may be associated with or generated based on region 405 of source block 401 (please refer to FIG. 4). Although illustrated based on four regions and showing four arrays of distortion values 604, 605, 606, 607, distortion mesh 600 may be based on any number of regions and may include any number of arrays of distortion values. As used herein, a distortion mesh may include any suitable distortion values for generating a best motion vector as discussed herein. In some examples, a distortion mesh may include error measure between source and reference blocks provided for a multitude of reference locations and forming a continuous two dimensional collection at a uniform sampling distance/resolution.

Returning to FIG. 5, as discussed, motion estimation controller 501 may receive distortion meshes such as distortion mesh 107 based on multiple calls such as call 505 to motion estimation engine 105. Motion estimation controller 501 may generate a distortion mesh based on the received array distortion meshes to generate a grid distortion mesh such as distortion mesh 600. As discussed, each call for a pixel block may be made with the same seed motion vector and each of the array distortion meshes may include the same candidate motion vectors. Based on the generated grid distortion mesh, motion estimation controller 501 may determine a best motion vector for the current pixel block. For example, a seed motion vector may be determined (as discussed further herein) for a pixel block such as pixel block 401. Multiple calls may be made to motion estimation 105 for regions of the pixel block such as regions 402-405 of pixel block 401 and the resultant (array) distortion meshes may be combined into a (grid) distortion mesh as illustrated with respect to FIG. 6. It may be pointed out that the same seed motion vector and candidate motion vectors have been evaluated for different regions of the pixel block.

As discussed, motion estimation controller 501 may determine best motion vector 506 for the current pixel block based on the generated grid distortion mesh. Turning again to FIG. 6, motion estimation controller may generate distortion summation values 603 (labeled as DS1-9 in FIG. 6) such that each value of distortion summation values is a summed distortion across regions for an associated motion vector. For example, distortion summation value DS3 may be a summation of distortion values D3,1-D3,4 and may be associated with candidate motion vector MV3. In some examples, motion estimation controller 501 may determine best motion vector 506 s the motion vector of candidate motion vectors 601 having a minimum distortion summation value of distortion summation values 603. Although discussed with respect to distortion summation values, the best motion vector determination may be based on any suitable value such as a weighted distortion summation values (with different regions having different weights for example), mean distortion values, or the like. Furthermore, additional characteristics of distortion mesh 600 may be used to generate the best motion vector such as ranges of distortion values for candidate motion vectors, deviation from the mean values for candidate motion vectors, or the like.

Returning to FIG. 5, in some examples, best motion vector 506 may be used for repeated processing to generate a more accurate best motion vector. For example, best motion vector 506 may be used as a seed motion vector for the current pixel block and the discussed process (e.g., multiple calls to generate a grid distortion mesh, summing such distortion values across regions for each candidate motion vector, and selecting a best motion vector associated with a minimum distortion summation value) may be repeated to find a more accurate (e.g., half pel instead of integer or quarter pel instead of half pel or the like) best motion vector.

In either the case of a single processing loop or multiple processing loops, best motion vector 506 may be transferred within device 500 for processing via one or more other modules. For example, best motion vector 506 may be used via an encoder engine to encode the pixel block and current image frame (e.g., a difference motion vector based on best motion vector 506 may be entropy encoded into a bitstream for transfer to a decoder), best motion vector 506 may used via a local decode loop to generate a residual for the pixel block (e.g., by applying best motion vector 506 to a reconstructed pixel block of a reconstructed image frame and differencing the pixel block and the reconstructed pixel block), which may be transformed, quantized, and entropy encoded into a bitstream for transfer to a decoder, or the like. Such processing may be performed via one or modules of an encoder or encoder engine or the like (not shown). In other examples, best motion vector 506 may be used for gesture or object tracking via a gesture tracking module, circuitry, engine, or the like or an object tracking module, circuitry, engine, or the like (not shown). In yet other examples, best motion vector 506 may be used for image stabilization via an image stabilizer associated with a camera or the like of device 500. Although discussed with respect to encode operations, gesture tracking, object tracking, and image stabilization, best motion vector 506, distortion mesh 107, distortion mesh 600, or other data generated as discussed herein may be used via any suitable image processing techniques. In some examples, such data may be provided as a portion of an image processing pipeline for example.

As discussed, seed motion vector 103 may be provided to motion estimation engine 105 for the generation of candidate motion vectors 202-209. Also as discussed, seed motion vector 103 may be associated with a pixel block and seed motion vector 103 may be generated using any suitable technique or techniques.

Figure 7:
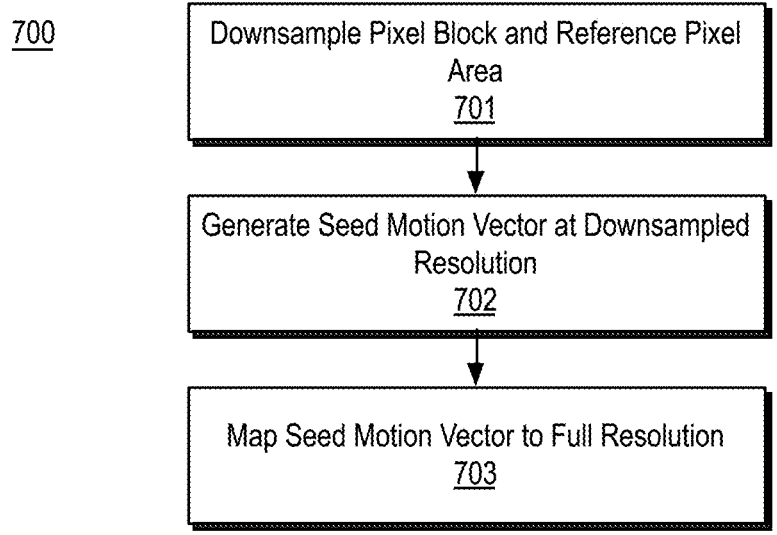
FIG. 7 is a flow diagram illustrating an example process for determining a seed motion vector for a pixel block.

FIG. 7 is a flow diagram illustrating an example process 700 for determining a seed motion vector for a pixel block, arranged in accordance with at least some implementations of the present disclosure. Process 700 may include one or more operations 701-703 as illustrated in FIG. 7. Process 700 may be performed by a device (e.g., device 500 as discussed herein) to determine a seed motion vector for a pixel block. For example, process 700 may be performed at a pixel block level for a pixel block that has regions that are to be independently processed via a motion estimation engine as discussed herein. In various contexts, such as in the encoding context, the seed motion vector may be associated with a pixel block characterized as a macroblock, a largest coding unit, a coding unit, or the like. Process 700 may be repeated for any number of pixel blocks. In some examples, process 700 may be performed by motion estimation controller 501 of device 500.

Process 700 may begin at operation 701, "Downsample Pixel Block and Reference Pixel Area", where a pixel block such as pixel block 401 and a reference pixel area may be downsampled. For example, the source pixel block and the reference pixel block may be downsampled by the same sampling rate and such that the source pixel block may be processed by a motion estimation engine such as motion estimation engine 105. In an example, the pixel block and the reference pixel area may be downsampled by 2:1 in both the x and y directions to generate a downsampled pixel block and a downsampled reference pixel area, although any suitable downsampling ratios may be implemented.

Process 700 may continue at operation 702, "Generate Seed Motion Vector at Downsampled Resolution", where a seed motion vector may be generated at the downsampled resolution based on the downsampled pixel block and a downsampled reference pixel area. For example, operation 702 may be implemented via motion estimation engine 105 based on providing motion estimation engine 105 or a similar motion estimation engine capable of generating estimated motion vectors based on providing the downsampled pixel block as source pixel block 101 and the downsampled reference pixel area as reference pixel area 102 (along with mesh enable/disable signal 104 disabled if needed), please refer to FIG. 1. The resultant estimated motion vector 106 may be a seed motion vector at a downsampled resolution.

Process 700 may continue at operation 703, "Map Seed Motion Vector to Full Resolution", where the seed motion vector at the downsampled resolution may be upsampled or mapped to a full resolution to generate a seed motion vector for the pixel block. For example, if the downsample ratio was 2:1 in both the x and y directions, the seed motion vector at the downsampled resolution may be upsampled via an upsample ratio of 1:2. For example, a quarter pel seed motion vector generated at the downsampled resolution may correspond to a half pel seed motion vector once upsampled at operation 703 and, a half pel seed motion vector generated at the downsampled resolution may correspond to an integer seed motion vector once upsampled at operation 703. The seed motion vector generated via process 700 may be used as discussed with respect to seed motion vector 103 or elsewhere herein.

As discussed, the pixel blocks and/or regions of the pixel blocks discussed herein may be any shape and size. Furthermore, in some examples, a mask may be provided to implement shapes and/or to disable distortion contributions for certain pixels of the pixel blocks and/or regions of the pixel blocks.

Figure 8:
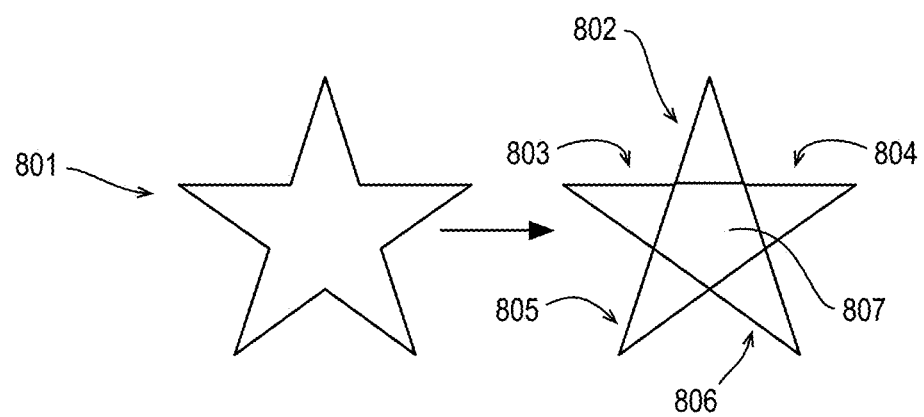
FIG. 8 illustrates an example pixel block.

FIG. 8 illustrates an example pixel block 801, arranged in accordance with at least some implementations of the present disclosure. As shown in FIG. 8, pixel block 801 may include any suitable shape. In the example illustrated in FIG. 8, pixel block 801 has a star shape. In other examples, pixel block 801 may have a square shape (as shown with respect to pixel block 401), a rectangular shape, a hexagonal shape, a triangular shape, a pentagonal shape or any arbitrary shape. In some examples, the shape of pixel block 801 may include one or more arcs. For example, pixel block 801 may have a circular shape, an elliptical shape, or the like. In some examples, the shape of pixel block 801 may include a combination of straight boundaries and curved or arced boundaries. Furthermore, pixel block 801 may be divided into multiple of the same shapes or, as illustrated in FIG. 8, pixel block 801 may be into multiple different shapes. For example, pixel block 801 is divided into 6 regions 802-807, 5 of which are triangular (e.g., regions 802-806) and one of which is pentagonal (e.g., region 807). For example, regions of pixel blocks may have any suitable shape such as a square shape (as shown with respect to pixel block 401), a rectangular shape, a hexagonal shape, a triangular shape, a pentagonal shape or any arbitrary shape. Furthermore, pixel block 801 and regions 802-807 may be of any suitable size. In some examples, the shape one or more of regions of a pixel may include one or more arcs. For example, the one or more regions may have a circular shape, an elliptical shape, or the like. In some examples, the shape of one or more regions may include a combination of straight boundaries and curved or arced boundaries.

As discussed, in some examples, regions such as regions 802-807 may be provided to a motion estimation engine such as motion estimation engine 105 as source pixel blocks for the generation of a distortion mesh. In some examples, the limitation of the motion estimation engine may be based on a size of the source pixel block and not on a shape of the source pixel block such that processing may be performed on any shape of source pixel block. Furthermore, as discussed with respect to FIG. 6, a distortion mesh may be used to generate distortion summation values or other suitable values based on the distortion mesh. Also as discussed, in some examples, the distortion summation values may be weighted summation values. In examples where regions 802-807 are of different sizes, such weights may be based on the relative sizes of regions such that larger regions receive larger weights.

In addition to arbitrary shape processing, motion estimation may be provided based on masking portions of pixel blocks or regions of pixel blocks. Such masking may provide additional control over the shapes for which motion estimation is being provided. For example, any shape may be searched for a best motion vector based on such pixel masking.

Figure 9:
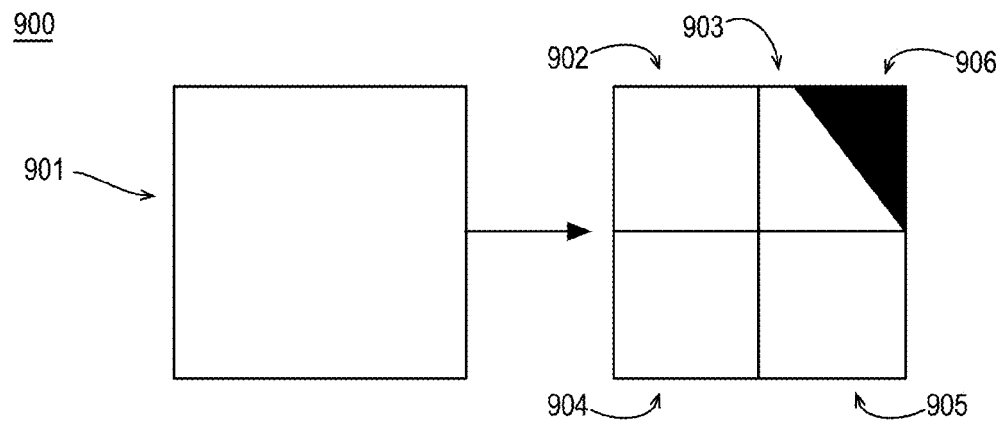
FIG. 9 illustrates an example pixel mask applied to an example pixel block.

FIG. 9 illustrates an example pixel mask 906 applied to an example pixel block 901, arranged in accordance with at least some implementations of the present disclosure. As shown in FIG. 9, pixel block 901 may include or be divided into regions 902-905. In the example of FIG. 9, pixel block 901 and regions 902-905 are square, however, pixel block 901 and regions 902-905 may be of any shape as discussed herein.

Also as shown, pixel mask 906 such as a region pixel mask for masking a region of regions 902-905 such as region 903 or a pixel block mask for masking regions or portions of pixel block 901 may be applied to pixel block 901 and/or regions 902-905. In the illustrated example, pixel mask 906 is triangular in shape, continuous, and applied to a top-right portion of pixel block 901 and pixel region 903. However, pixel mask 906 may be any shape, may be discontinuous and/or include multiple disconnected portions, and may be applied to any portion of pixel block 901 and/or pixel regions 902-905.

Figure 10:
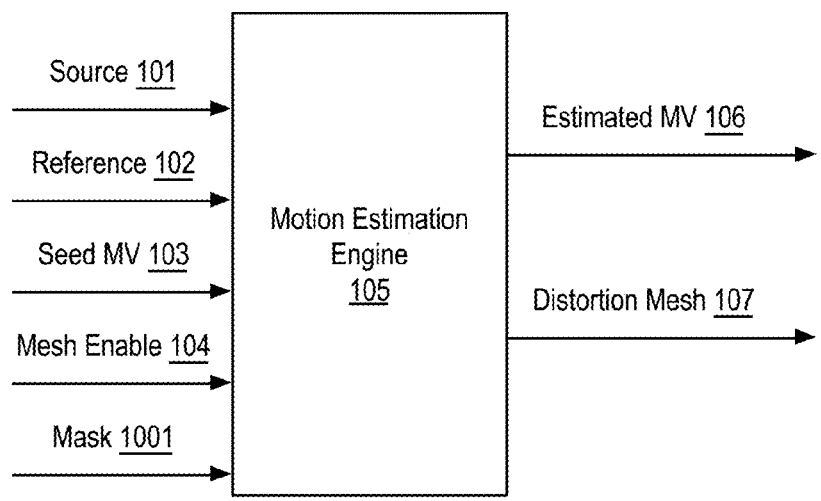
FIG. 10 is a block diagram illustrating an example motion estimation engine.

FIG. 10 is a block diagram illustrating an example motion estimation engine 105, arranged in accordance with at least some implementations of the present disclosure. Motion estimation engine 105 may include any capabilities as discussed elsewhere herein. Furthermore, motion estimation engine 105 may receive a pixel mask 1001. Pixel mask 1001 may include any suitable data or data structure that provides for a pixel mask such as pixel mask 906. For example, pixel mask 1001 may include a signal indicating pixels of source pixel block 101 that are to be disabled in generating distortion mesh 107. For example, disabled pixels may not be taken into account in generating distortion values 304 of distortion mesh 107 (please refer to FIG. 3).

As discussed, in some examples, pixel mask 1001 may disable pixels for the generation of distortion values. In such examples, pixel mask 1001 may be implemented as a binary mask such that values of 0 within the binary mask disable the pixels and values of 1 within the binary mask enable the pixels for the generation of distortion values. In other examples, pixel mask 1001 may include a filter or a variable filter such that masked pixel values contribute less to the distortion value (e.g., pixel mask 1001 may be a weighted filter or the like). For example, pixel mask 1001 may include the same or different values for each pixel represented by the mask such that those pixels are weighted less than unmasked pixels.

Figure 11:
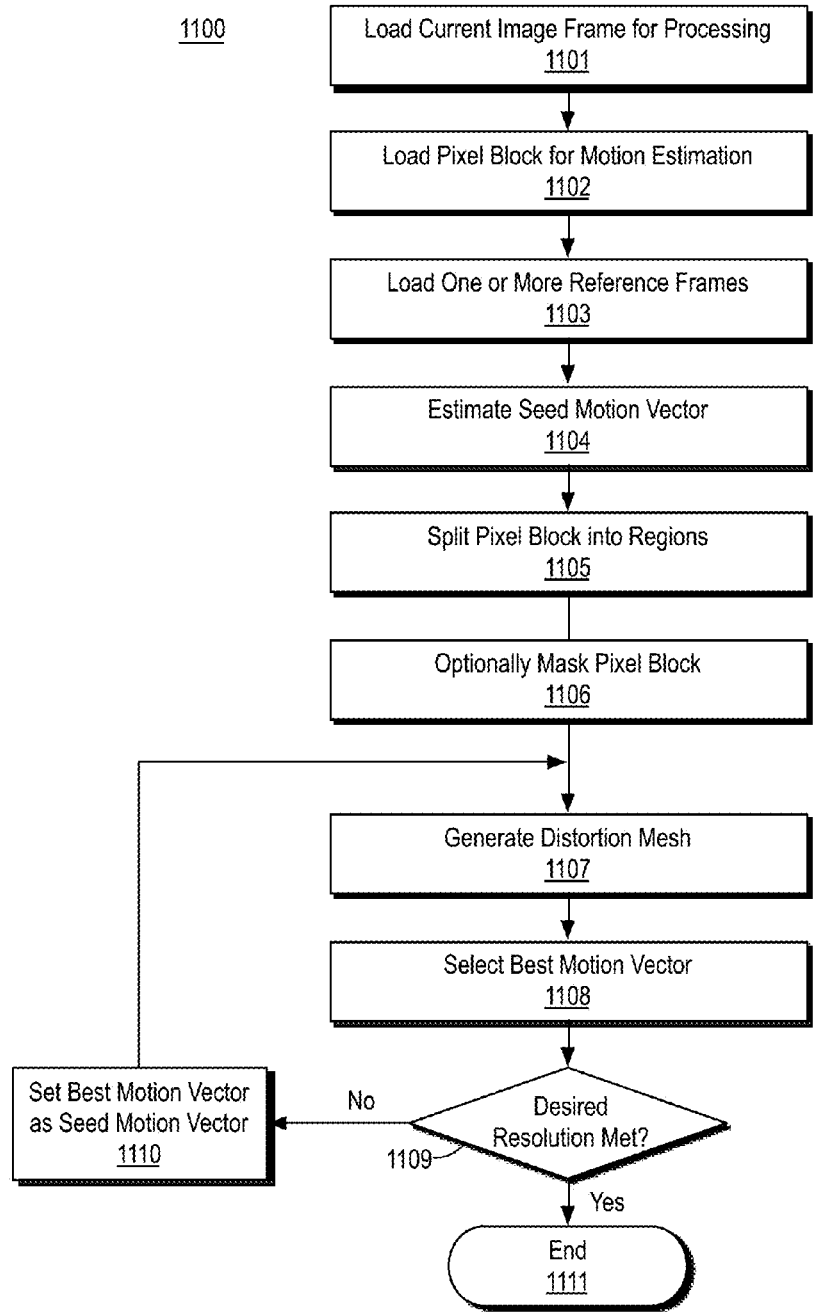
FIG. 11 is a flow diagram illustrating an example process for determining a motion vector for a pixel block.

FIG. 11 is a flow diagram illustrating an example process 1100 for determining a motion vector for a pixel block, arranged in accordance with at least some implementations of the present disclosure. Process 1100 may include one or more operations 1101-1111 as illustrated in FIG. 1. Process 1100 may be performed by a device (e.g., device 500 as discussed herein) to determine a motion vector for a pixel block. For example, process 1100 may be performed at a pixel block level as discussed herein. In various contexts, such as in the encoding context, the motion vector may be associated with a pixel block characterized as a macroblock, a largest coding unit, a coding unit, or the like. Process 1100 may be repeated for any number of pixel blocks and/or image frames.

Process 1100 may begin at operation 1101, "Load Current Image Frame for Processing", where an image frame may be loaded for processing. The image frame may include any suitable image frame such as a frame of a video sequence, a current frame received via a camera of a device (e.g., a frame to be processed in real time) or the like. Furthermore, the image frame may include any suitable data or data structure. For example, the current image frame may be loaded into a memory such as memory 502 of device 500.

Process 1100 may continue at operation 1102, "Load Pixel Block for Motion Estimation", where a pixel block of the current image frame may be loaded for processing. As discussed herein, the pixel block may be any suitable size and shape. In some examples, the current image frame may be divided into pixel blocks for processing based on a predetermined pattern or partitioning information. In other examples, a wide range of partitioning options for an image frame may be evaluated to determine an optimal coding pattern for the frame. For example, operations 1102-1111 may be repeated for any number of pixel blocks of any number of image frames.

Process 1100 may continue at operation 1103, "Load One or More Reference Frames", where one or more reference frames or portions thereof may be loaded for processing. The reference frame or frames may include any suitable reference frames such as a temporally previous frame or frames, a temporally subsequent frame or frames, a combination of such frames, a synthesized or otherwise processed frame or frames, or the like. For example, the current image frame may be loaded into a memory such as memory 502 of device 500. In some examples, the one or more reference frames may include reference frame areas or regions as discussed herein.

Process 1100 may continue at operation 1104, "Estimate Seed Motion Vector", where a seed motion vector may be estimated for the current pixel block. The seed motion vector may be estimated or determined using any suitable technique or techniques such as those discussed with respect to process 700 herein. For example, the seed motion vector may be determined by downsampling the pixel block and a reference pixel area, determining a downsampled best motion vector for the downsampled pixel block and reference pixel area, and mapping the downsampled best motion vector to the resolution of the original pixel block.

Process 1100 may continue at operation 1105, "Split Pixel Block into Regions", wherein the pixel block may be split or divided into regions or portions or the like. As discussed, the pixel block may be divided into any shape of regions. In some examples, the pixel block may be divided into regions that may be processed (e.g., are small enough to be processed) by a motion estimation engine such as a motion estimation engine implemented via hardware.

Process 1100 may continue at operation 1106, "Optionally Mask Pixel Block", where an optional pixel mask may be applied to the pixel block. For example, the pixel mask may disable or apply decreased weighting to particular pixels of the current pixel block.

Process 1100 may continue at operation 1107, "Generate Distortion Mesh", where a distortion mesh may be generated for the pixel block. For example, multiple calls may be made to a motion estimation engine such that each call is for a separate region of the pixel block. The call may include, for example, a source pixel block representing the current region, the seed motion vector (e.g., the seed motion vector may be the same across all calls for the current pixel block), a reference pixel area, a mesh enable signal, and an optional pixel mask. In response to each call, a distortion mesh may be provided. For example, each received distortion mesh may be an array distortion mesh including an array of distortion values associated with the current region of the current pixel block such that each distortion value is associated with a candidate motion vector associated with the seed motion vector or the seed motion vector itself.

The received distortion meshes may be combined to form a grid distortion mesh. As discussed with respect to FIG. 6, such a grid distortion mesh may include distortion values each associated with a region of the pixel block and a candidate motion vector. As used herein, the term distortion mesh may apply to a distortion array associated with a single call to a motion estimation engine (e.g., for a source pixel block within a call) or a combination of such distortion arrays (e.g., a grid of arrays each associated with a region of a pixel block).

Process 1100 may continue at operation 1108, "Select Best Motion Vector", where a best motion vector may be selected for the pixel block based on the distortion mesh. For example, the discussed grid distortion mesh may be evaluated to select a best motion vector for the pixel block. In an example, multiple distortion summation values may be determined with each of the values associated with a candidate motion vector or the seed motion vector itself (e.g., a multiple distortion summation value may be for a particular candidate motion vector and may include a summation of the distortion values for that candidate motion vector for each region of the pixel block). As discussed, other values such as average distortion values, ranges of distortion values, or the like may be used to select the best motion vector either in place of the distortion summation values or in combination with the discussed distortion summation values.

Process 1100 may continue at decision operation 1109, "Desired Resolution Met?", where a determination may be made as to whether a desired resolution of the best motion vector has been met. As discussed, in various examples, the seed motion vector may be an integer motion vector and the best motion vector may also be an integer motion vector, the seed motion vector may be an integer motion vector and the best motion vector may also be a half pel motion vector, the seed motion vector may be a half pel motion vector and the best motion vector may also be a quarter pel motion vector, or the like. For example, decision operation 1109 may reference whether the current resolution of the best motion vector (e.g., integer, half pel, or quarter pel) meets a desired resolution. Such a determination may be made based on a setting which may be selected by a user or developer or such a determination may be made based on the distortion associated with the current best motion vector. For example, if the distortion is less than a threshold, the desired resolution may be met and if not, processing may continue to attempt to find a better motion vector for the current pixel block. As shown, if the desired resolution is met, process 1100 may end for the current pixel block at ending operation 1111.

If the desired resolution is not met, process 1100 may continue at operation 1110, "Set Best Motion Vector as Seed Motion Vector," where the best motion vector may be set to or used as the seed motion vector. As shown, based on the new seed motion vector, process 1100 may repeat operations 1107, 1108, and 1109 as discussed to determine an enhanced resolution best motion vector. For example, if at a first pass, the resolution is a half pel motion vector a second pass may provide a quarter pel motion vector resolution.

As discussed, process 1100 may be repeated or may be repeated in part for any number of pixel blocks, partitionings of image frames within to pixel blocks (e.g., different partitionings), image frames, combinations of image frames and reference image frames, or the like. Such processing may provide accurate and efficient determinations of motion vectors via limited hardware resources.

Figure 12:
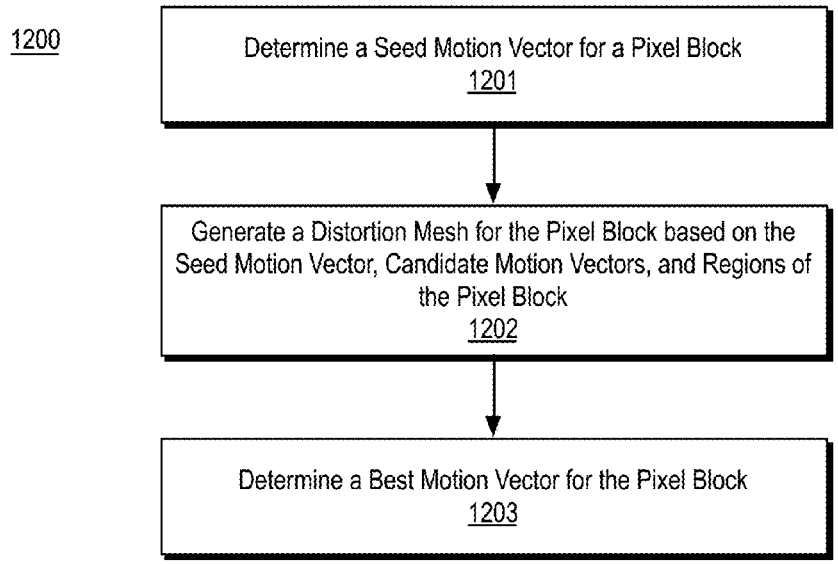
FIG. 12 is a flow diagram illustrating an example process for providing motion estimation.

FIG. 12 is a flow diagram illustrating an example process 1200 for providing motion estimation, arranged in accordance with at least some implementations of the present disclosure. Process 1200 may include one or more operations 1201-1203 as illustrated in FIG. 12. Process 1200 may form at least part of a motion estimation process. By way of non-limiting example, process 1200 may form at least part of a motion estimation process performed by device 500 as discussed herein. Furthermore, process 1200 will be described herein with reference to system 1300 of FIG. 13.

Figure 13:
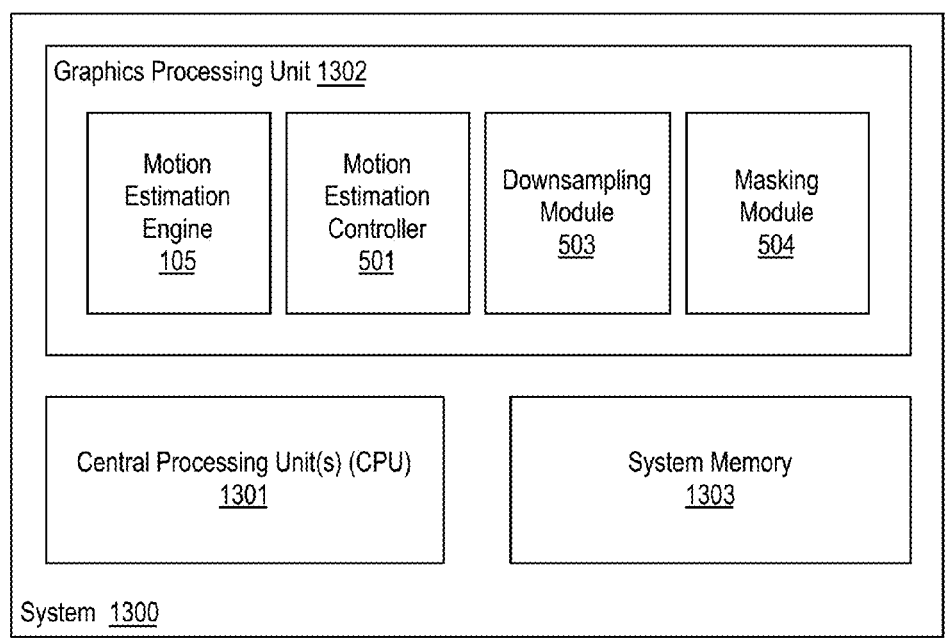
FIG. 13 is an illustrative diagram of an example system for providing motion estimation.

FIG. 13 is an illustrative diagram of an example system 1300 for providing motion estimation, arranged in accordance with at least some implementations of the present disclosure. As shown in FIG. 13, system 1300 may include one or more central processing units (CPU) 1301, a graphics processing unit (GPU) 1302, and memory stores 1303. Also as shown, GPU 1302 may include motion estimation engine 105, motion estimation controller 501, downsampling module 503, and masking module 504. Such modules may be implemented to perform operations as discussed herein. In the example of system 1300, memory stores 1303 may store motion estimation data or other vide data video data such as input video, video frames, image frames, reference frames, pixel block data, pixel data, region data, source pixel block data, reference area pixel data, partitioning data, pixel mask data, motion vector data, distortion mesh data, or any other data as discussed herein.

As shown, in some examples, motion estimation engine 105, motion estimation controller 501, downsampling module 503, and masking module 504 may be implemented via graphics processing unit 1302. In other examples, one or more or portions of motion estimation engine 105, motion estimation controller 501, downsampling module 503, and masking module 504 may be implemented via central processing units 1301. In yet other examples, one or more or portions of motion estimation engine 105, motion estimation controller 501, downsampling module 503, and masking module 504 may be implemented via an encode pipeline and/or an imaging processing pipeline or unit.

Graphics processing unit 1302 may include any number and type of graphics processing units that may provide the operations as discussed herein. Such operations may be implemented via software or hardware or a combination thereof. For example, graphics processing unit 1302 may include circuitry dedicated to manipulate frame or video data obtained from memory stores 1303. Central processing units 1301 may include any number and type of processing units or modules that may provide control and other high level functions for system 1300 and/or provide any operations as discussed herein. Memory stores 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1303 may be implemented by cache memory. In an embodiment, one or more or portions of motion estimation engine 105, motion estimation controller 501, downsampling module 503, and masking module 504 may be implemented via an execution unit (EU) of graphics processing unit 1302. The EU may include, for example, programmable logic or circuitry such as a logic core or cores that may provide a wide array of programmable logic functions. In an embodiment, one or more or portions of motion estimation engine 105, motion estimation controller 501, downsampling module 503, and masking module 504 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 12, process 1200 may begin at operation 1201, "Determine a Seed Motion Vector for a Pixel Block", where a seed motion vector may be determined for a pixel block having a plurality of regions. The seed motion vector may be determined using any suitable technique or techniques. For example, the pixel block and a reference pixel area may be downsampled and the seed motion vector may be generated based on the downsampled pixel block and reference pixel area. For example, downsampling module 503 as may downsample the pixel block and a reference pixel area and motion estimation engine 105 may generate a downsampled seed motion vector based on the downsampled pixel block and reference pixel area based on a call made via motion estimation controller 501. The downsampled seed motion vector may be mapped to a full resolution motion vector via motion estimation controller 501.

As discussed, the pixel block and the regions of the pixel block may be any suitable size and shape. In some examples, the pixel block may be of a square shape, a rectangular shape, a hexagonal shape, a triangular shape, or a star shape. In some examples, one or more regions of the regions may be of a square shape, a rectangular shape, a hexagonal shape, or a triangular shape. In some examples, the regions may be the same size and shape and, in other examples, the regions may have different sizes and/or shapes.

Processing may continue at operation 1202, "Generate a Distortion Mesh for the Pixel Block based on the Seed Motion Vector, Candidate Motion Vectors, and Regions of the Pixel Block", where a distortion mesh may be generated for the pixel block. For example, the distortion mesh may include a plurality of distortion values associated with the regions, the seed motion vector, and candidate motion vectors associated with the seed motion vector. The motion vectors associated with the seed motion vector may be adjacent to and surrounding the seed motion vector for example. In some examples, the discussed distortion values are each associated with a region of the regions and a candidate motion vector of the plurality of candidate motion vectors. For example, the candidate motion vectors may include the seed motion vector. In some examples, generating the distortion mesh may include multiple calls to a block based motion estimation engine (e.g., one for each region of the pixel block) such that each call uses the seed motion vector. For example, motion estimation controller 501 may generate the distortion mesh based on multiple calls (e.g., one for each region of the pixel block) to motion estimation engine 105 such that motion estimation engine 105 may provide arrays of distortion values (e.g., one for each call) that may be combined to form the distortion mesh.

As discussed, in some examples, generating the distortion mesh may include disabling a subset of pixels of the pixel block or one or more regions of the pixel block. For example, the subset of pixels may be disabled based on a pixel mask as discussed herein.

Processing may continue at operation 1203, "Determine a Best Motion Vector for the Pixel Block", where a best motion vector may be determined for the pixel block based on the distortion mesh. For example, motion estimation controller 501 may determine the best motion vector. In some examples, determining the best motion vector may include determining a minimum distortion summation value from a plurality of distortion summation values such that each of the distortion summation values is associated with a candidate motion vector of the plurality of candidate motion vectors or the seed motion vector.

Such a process may generate a best motion vector for a pixel block based on a seed motion vector and a distortion mesh generated using the seed motion vector and regions of the pixel block. Such processing may allow efficient use of a block based motion estimation engine (e.g., implemented via hardware) that cannot handle processing the pixel block due to the pixel block being too large and/or efficient use of limited processing resources or the like.

As discussed, such processing may provide a half pel best motion vector via half pel candidate motion vectors and an integer seed motion vector or a quarter pel best motion vector via quarter pel candidate motion vectors and a half pel seed motion vector or the like. Furthermore, process 1200 may be repeated by using the best motion vector as the seed motion vector to generate an enhanced resolution best motion vector. For example, a second distortion mesh may be generated for the pixel block such that the second distortion mesh include second distortion values associated with the regions, the best motion vector, and second candidate motion vectors associated with the best motion vector and an enhanced resolution best motion vector may be determined for the pixel block based on the second distortion mesh.

Process 1200 may be repeated any number of times either in series or in parallel for any number of portions of a video and/or video frames. Process 1200 may provide for accurate motion vectors for pixel blocks using techniques that save computational complexity and hardware implementation complexity.

Various components of the systems described herein may be implemented in software, firmware, and/or hardware and/or any combination thereof. For example, various components of device 100, device 500, system 1300, system 1400, or device 1500 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as gesture tracking circuitry, object tracking circuitry, image stabilization circuitry, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 100, device 500, system 1300, system 1400, or device 1500, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
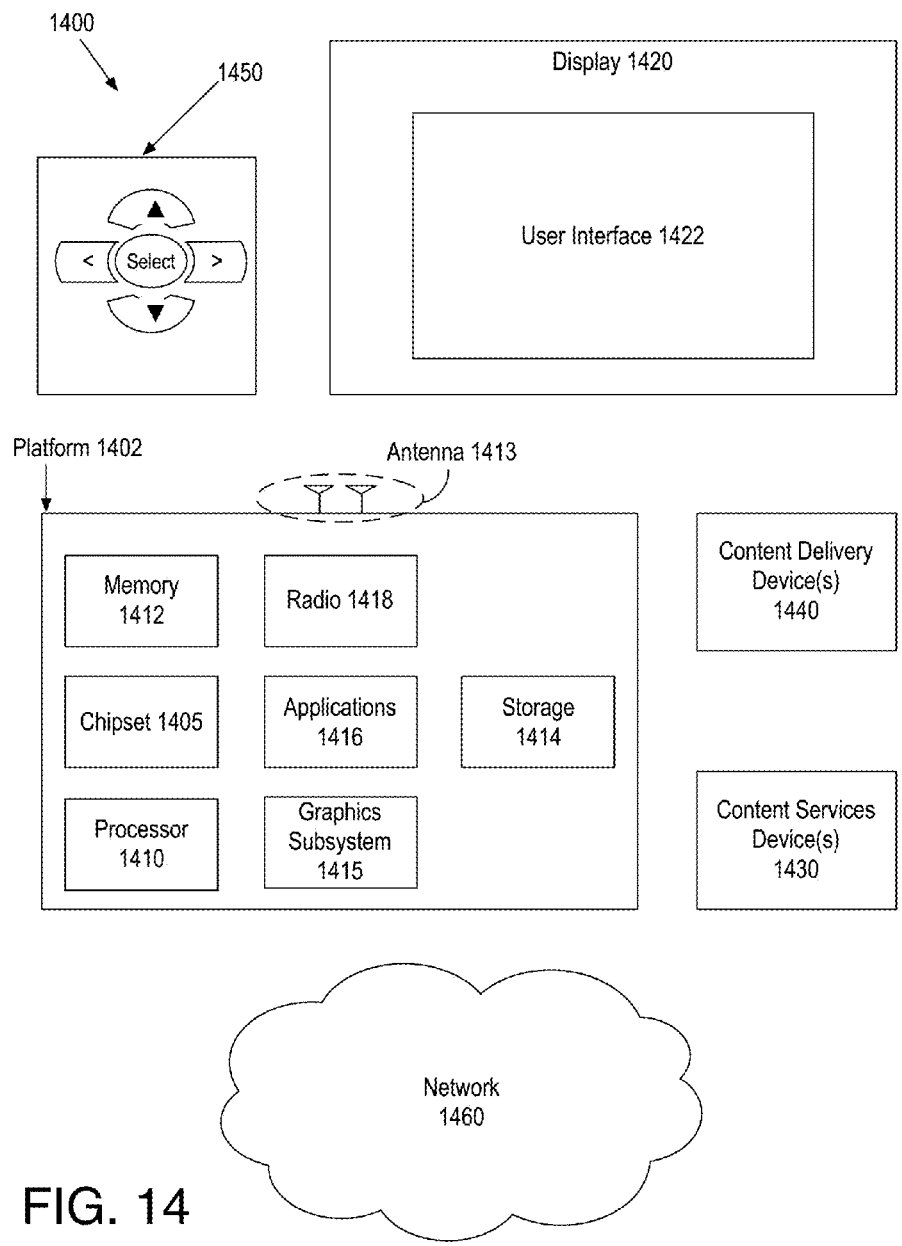
FIG. 14 is an illustrative diagram of an example system.

FIG. 14 is an illustrative diagram of an example system 1400, arranged in accordance with at least some implementations of the present disclosure. In various implementations, system 1400 may be a computing system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of navigation controller 1450 may be used to interact with user interface 1422, for example. In various embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In various embodiments, navigation controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
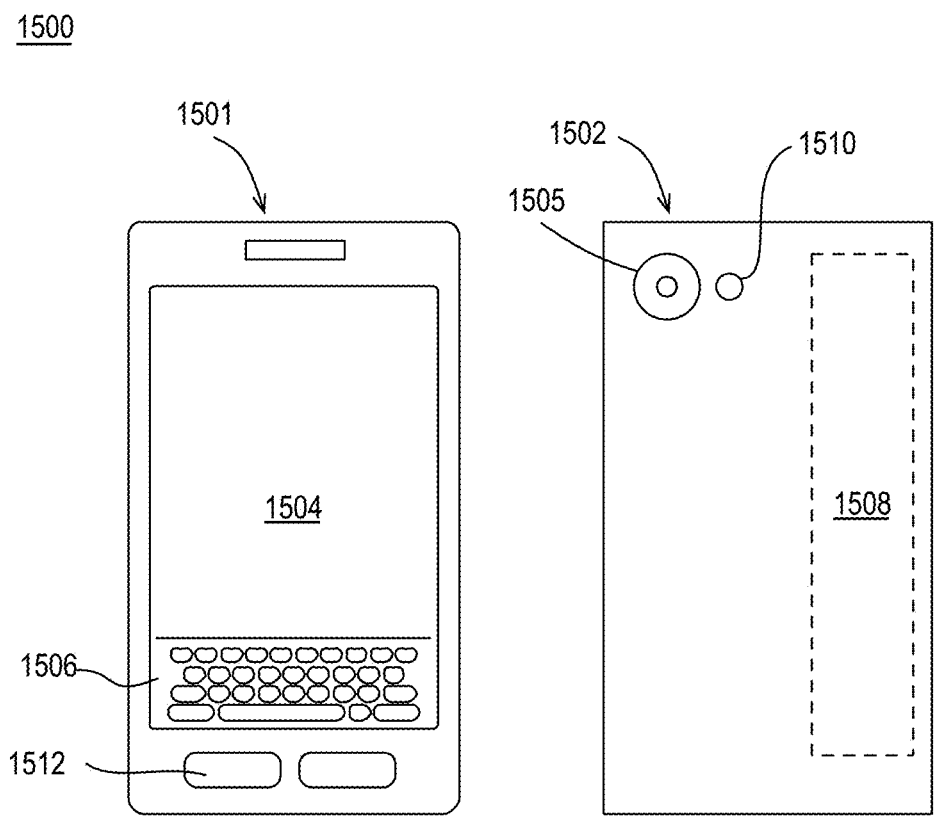
FIG. 15 illustrates an example small form factor device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, imaging device 101, system 900, or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500. In other examples, camera 1505 and flash 1510 may be integrated into front 1501 of device 1500 or both front and back cameras may be provided. Camera 1505 and flash 1510 may be components of a camera module to originate image data processed into streaming video that is output to display 1504 and/or communicated remotely from device 1500 via antenna 1508 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for providing motion estimation comprises determining, for a pixel block having a plurality of regions, a seed motion vector, generating a distortion mesh for the pixel block, wherein the distortion mesh comprises a plurality of distortion values associated with the plurality of regions, the seed motion vector, and a plurality of candidate motion vectors associated with the seed motion vector, and determining a best motion vector for the pixel block based on the distortion mesh.

Further to the first embodiments, the distortion values are each associated with a region of the plurality of regions and a candidate motion vector of the plurality of candidate motion vectors, wherein the candidate motion vectors comprise the seed motion vector.

Further to the first embodiments, the pixel block comprises at least one of a square shape, a rectangular shape, or a triangular shape.

Further to the first embodiments, a first region of the plurality of regions comprises at least one of a square shape, a rectangular shape, or a triangular shape.

Further to the first embodiments, the pixel block comprises at least one of a square shape, a rectangular shape, or a triangular shape and/or a first region of the plurality of regions comprises at least one of a square shape, a rectangular shape, or a triangular shape.

Further to the first embodiments, generating the distortion mesh comprises disabling a subset of pixels of the first region based on a first pixel region mask associated with the first region.

Further to the first embodiments, generating the distortion mesh comprises a plurality of calls to a block based motion estimation engine and each of the plurality of calls comprises the seed motion vector.

Further to the first embodiments, generating the distortion mesh comprises a plurality of calls to a block based motion estimation engine, each of the plurality of calls comprises the seed motion vector, and the plurality of calls to the block based motion estimation engine comprise a call for each region of the plurality of regions.

Further to the first embodiments, generating the distortion mesh comprises a plurality of calls to a block based motion estimation engine, each of the plurality of calls comprises the seed motion vector, and/or the plurality of calls to the block based motion estimation engine comprise a call for each region of the plurality of regions.

Further to the first embodiments, determining the seed motion vector comprises downsampling the pixel block and the reference pixel area and generating the seed motion vector based on the downsampled pixel block and reference pixel area.

Further to the first embodiments, the method further comprises generating a second distortion mesh for the pixel block, wherein the second distortion mesh comprises a plurality of second distortion values associated with the plurality of regions, the best motion vector, and a plurality of second candidate motion vectors associated with the best motion vector and determining an enhanced resolution best motion vector for the pixel block based on the second distortion mesh.

Further to the first embodiments, determining the best motion vector comprises determining a minimum distortion summation value from a plurality of distortion summation values and each of the distortion summation values is associated with a candidate motion vector of the plurality of candidate motion vectors or the seed motion vector.

Further to the first embodiments, the seed motion vector is an integer motion vector and the candidate motion vectors are half pel motion vectors.

Further to the first embodiments, the seed motion vector is a half pel motion vector and the candidate motion vectors are quarter pel motion vectors.

In one or more second embodiments, a system for providing a motion estimation comprises a memory configured to receive an image frame comprising a pixel block having a plurality of regions, motion estimation engine circuitry coupled to the memory, and controller circuitry coupled to the motion estimation engine circuitry, the controller circuitry to generate a distortion mesh for the pixel block based on a plurality of calls to the motion estimation engine circuitry, wherein the distortion mesh comprises a plurality of distortion values associated with the plurality of regions, a seed motion vector, and a plurality of candidate motion vectors associated with the seed motion vector, and to determine a best motion vector based on the distortion mesh, and the motion estimation engine circuitry to generate a first array of distortion values of the plurality of distortion values and associated with a first region of the plurality of regions based on a first call from the controller circuitry.

Further to the second embodiments, the distortion values are each associated with a region of the plurality of regions and a candidate motion vector of the plurality of candidate motion vectors and the candidate motion vectors comprise the seed motion vector.

Further to the second embodiments, the pixel block comprises at least one of a square shape, a rectangular shape, or a triangular shape.

Further to the second embodiments, the first region of the plurality of regions comprises at least one of a square shape, a rectangular shape, or a triangular shape Further to the second embodiments, the motion estimation engine circuitry to generate the first array of distortion values comprises the motion estimation engine circuitry to disable a subset of pixels of the first region based on a first pixel region mask associated with the first region.

Further to the second embodiments, the first region of the plurality of regions comprises at least one of a square shape, a rectangular shape, or a triangular shape, the first region of the plurality of regions comprises at least one of a square shape, a rectangular shape, or a triangular shape, and/or generating the distortion mesh comprises disabling a subset of pixels of the first region based on a first pixel region mask associated with the first region.

Further to the second embodiments, each of the plurality of calls comprises the seed motion vector.

Further to the second embodiments, the system further comprises downsampling circuitry to downsample the pixel block and a reference pixel area, the motion estimation engine circuitry is to generate a downsampled seed motion vector based on the downsampled pixel block and reference pixel area, and the controller circuitry is to determine the seed motion vector based on the downsampled seed motion vector.

Further to the second embodiments, the controller circuitry is further to generate a second distortion mesh for the pixel block based on a plurality of second calls to the motion estimation engine circuitry, the second distortion mesh comprises a plurality of second distortion values associated with the plurality of regions, the best motion vector, and a plurality of second candidate motion vectors associated with the best motion vector and to determine an enhanced resolution best motion vector for the pixel block based on the second distortion mesh.

Further to the second embodiments, the controller circuitry to determine the best motion vector comprises the controller circuitry to determine a minimum distortion summation value from a plurality of distortion summation values and each of the distortion summation values is associated with a candidate motion vector of the plurality of candidate motion vectors or the seed motion vector.

Further to the second embodiments, the seed motion vector is an integer motion vector and the candidate motion vectors are half pel motion vectors or the seed motion vector is a half pel motion vector and the candidate motion vectors are quarter pel motion vectors.

In one or more third embodiments, a system for providing a motion estimation comprises means for determining, for a pixel block having a plurality of regions, a seed motion vector, means for generating a distortion mesh for the pixel block, wherein the distortion mesh comprises a plurality of distortion values associated with the plurality of regions, the seed motion vector, and a plurality of candidate motion vectors associated with the seed motion vector, and means for determining a best motion vector for the pixel block based on the distortion mesh.

Further to the third embodiments, the distortion values are each associated with a region of the plurality of regions and a candidate motion vector of the plurality of candidate motion vectors and the candidate motion vectors comprise the seed motion vector.

Further to the third embodiments, the pixel block comprises at least one of a square shape, a rectangular shape, or a triangular shape and a first region of the plurality of regions comprises at least one of a square shape, a rectangular shape, or a triangular shape.

Further to the third embodiments, the means for generating the distortion mesh comprise means for disabling a subset of pixels of the first region based on a first pixel region mask associated with the first region.

Further to the third embodiments, the means for generating the distortion mesh comprise means for providing a plurality of calls to a block based motion estimation engine, each of the plurality of calls comprises the seed motion vector, and the plurality of calls to the block based motion estimation engine comprise a call for each region of the plurality of regions.

Further to the third embodiments, the means for determining the seed motion vector comprise means for downsampling the pixel block and the reference pixel area and means for generating the seed motion vector based on the downsampled pixel block and reference pixel area.

Further to the third embodiments, the system further comprises means for generating a second distortion mesh for the pixel block, wherein the second distortion mesh comprises a plurality of second distortion values associated with the plurality of regions, the best motion vector, and a plurality of second candidate motion vectors associated with the best motion vector and means for determining an enhanced resolution best motion vector for the pixel block based on the second distortion mesh.

Further to the third embodiments, the means for determining the best motion vector comprise means for determining a minimum distortion summation value from a plurality of distortion summation values and each of the distortion summation values is associated with a candidate motion vector of the plurality of candidate motion vectors or the seed motion vector.

Further to the third embodiments, the seed motion vector is an integer motion vector and the candidate motion vectors are half pel motion vectors or the seed motion vector is a half pel motion vector and the candidate motion vectors are quarter pel motion vectors.

In one or more fourth embodiments, at least one machine readable medium comprises a plurality of instructions that, in response to being executed on a computing device, cause the computing device to provide motion estimation by determining, for a pixel block having a plurality of regions, a seed motion vector, generating a distortion mesh for the pixel block, wherein the distortion mesh comprises a plurality of distortion values associated with the plurality of regions, the seed motion vector, and a plurality of candidate motion vectors associated with the seed motion vector, and determining a best motion vector for the pixel block based on the distortion mesh.

Further to the fourth embodiments, the distortion values are each associated with a region of the plurality of regions and a candidate motion vector of the plurality of candidate motion vectors, and the candidate motion vectors comprise the seed motion vector.

Further to the fourth embodiments, the pixel block comprises at least one of a square shape, a rectangular shape, or a triangular shape and a first region of the plurality of regions comprises at least one of a square shape, a rectangular shape, or a triangular shape.

Further to the fourth embodiments, generating the distortion mesh comprises disabling a subset of pixels of the first region based on a first pixel region mask associated with the first region.

Further to the fourth embodiments, generating the distortion mesh comprises a plurality of calls to a block based motion estimation engine and each of the plurality of calls comprises the seed motion vector.

Further to the fourth embodiments, determining the seed motion vector comprises downsampling the pixel block and the reference pixel area and generating the seed motion vector based on the downsampled pixel block and reference pixel area.

Further to the fourth embodiments, the machine readable medium comprises further instructions that, in response to being executed on a computing device, cause the computing device to provide motion estimation by generating a second distortion mesh for the pixel block, wherein the second distortion mesh comprises a plurality of second distortion values associated with the plurality of regions, the best motion vector, and a plurality of second candidate motion vectors associated with the best motion vector, and determining an enhanced resolution best motion vector for the pixel block based on the second distortion mesh.

Further to the fourth embodiments, determining the best motion vector comprises determining a minimum distortion summation value from a plurality of distortion summation values, wherein each of the distortion summation values is associated with a candidate motion vector of the plurality of candidate motion vectors or the seed motion vector.

Further to the fourth embodiments, the seed motion vector is an integer motion vector and the candidate motion vectors are half pel motion vectors or the seed motion vector is a half pel motion vector and the candidate motion vectors are quarter pel motion vectors.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the invention is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

What is claimed is:

1. A computer-implemented method for providing motion estimation comprising:
   determining a seed motion vector of a pixel block;
   dividing the pixel block into a plurality of regions, wherein the seed motion vector is based on the whole pixel block rather than a single region;
   generating a distortion mesh for the pixel block, wherein the distortion mesh comprises a plurality of distortion values wherein individual distortion values are each associated with (1) one of the plurality of regions, and (2) one of a plurality of candidate motion vectors associated with the seed motion vector, the generating comprising using the seed motion vector with each call to generate the distortion values; and determining a best motion vector for the whole pixel block based on the distortion mesh wherein determining the best motion vector comprises determining a minimum distortion summation value from a plurality of distortion summation values, wherein each of the distortion summation values is associated with a candidate motion vector of the plurality of candidate motion vectors or the seed motion vector.

2. The method of claim 1, wherein at least one of the candidate motion vectors comprise the seed motion vector.

3. The method of claim 1, wherein the pixel block comprises at least one of a square shape, a rectangular shape, or a triangular shape.

4. The method of claim 1, wherein a first region of the plurality of regions comprises at least one of a square shape, a rectangular shape, or a triangular shape.

5. The method of claim 1, wherein generating the distortion mesh comprises disabling a subset of pixels of a first region of the plurality of regions and based on a first pixel region mask associated with the first region.

6. The method of claim 1, wherein generating the distortion mesh comprises a plurality of the calls to a block based motion estimation engine, and wherein each of the plurality of calls comprises the seed motion vector.

7. The method of claim 6, wherein the plurality of calls to the block based motion estimation engine comprise a call for each region of the plurality of regions.

8. The method of claim 1, wherein determining the seed motion vector comprises:
downsampling the pixel block and a reference pixel area of a reference frame; and
generating the seed motion vector based on the downsampled pixel block and reference pixel area.

9. The method of claim 1, further comprising:
generating a second distortion mesh for the pixel block, wherein the second distortion mesh comprises a plurality of second distortion values associated with the plurality of regions, the best motion vector, and a plurality of second candidate motion vectors associated with the best motion vector; and
determining an enhanced resolution best motion vector for the pixel block based on the second distortion mesh.

10. The method of claim 1, wherein the seed motion vector is an integer motion vector and the candidate motion vectors are half pel motion vectors.

11. The method of claim 1, wherein the seed motion vector is a half pel motion vector and the candidate motion vectors are quarter pel motion vectors.

12. A system for providing a motion estimation comprising:
a memory configured to receive an image frame comprising a pixel block having a plurality of regions;
motion estimation engine circuitry coupled to the memory; and
controller circuitry coupled to the motion estimation engine circuitry, the controller circuitry to:
generate a distortion mesh for the pixel block based on a plurality of calls to the motion estimation engine circuitry, wherein the distortion mesh comprises a plurality of distortion values associated with the plurality of regions, a seed motion vector of the whole pixel block rather than a single region, and a plurality of candidate motion vectors associated with the seed motion vector, the generating comprising using the seed motion vector with each call to generate the distortion values, and to
determine a best motion vector of the whole pixel block based on the distortion mesh, wherein determining the best motion vector comprises determining a minimum distortion summation value from a plurality of distortion summation values, wherein each of the distortion summation values is associated with a candidate motion vector of the plurality of candidate motion vectors or the seed motion vector, and
the motion estimation engine circuitry to generate a first array of distortion values of the plurality of distortion values and associated with a first region of the plurality of regions based on a first call from the controller circuitry.

13. The system of claim 12, wherein the first region of the plurality of regions comprises at least one of a square shape, a rectangular shape, or a triangular shape.

14. The system of claim 12, wherein the motion estimation engine circuitry to generate the first array of distortion values comprises the motion estimation engine circuitry to disable a subset of pixels of the first region based on a first pixel region mask associated with the first region.

15. The system of claim 12, wherein each of the plurality of calls comprises the seed motion vector.

16. The system of claim 12, further comprising:
downsampling circuitry to downsample the pixel block and a reference pixel area of a reference frame, wherein the motion estimation engine circuitry is to generate a downsampled seed motion vector based on the downsampled pixel block and reference pixel area and the controller circuitry is to determine the seed motion vector based on the downsampled seed motion vector.

17. The system of claim 12, wherein the controller circuitry is further to generate a second distortion mesh for the pixel block based on a plurality of second calls to the motion estimation engine circuitry, wherein the second distortion mesh comprises a plurality of second distortion values associated with the plurality of regions, the best motion vector, and a plurality of second candidate motion vectors associated with the best motion vector and to determine an enhanced resolution best motion vector for the pixel block based on the second distortion mesh.

18. The system of claim 12, wherein the controller circuitry to determine the best motion vector comprises the controller circuitry to determine a minimum distortion summation value from a plurality of distortion summation values, wherein each of the distortion summation values is associated with a candidate motion vector of the plurality of candidate motion vectors or the seed motion vector.

19. The system of claim 12, wherein the seed motion vector is an integer motion vector and the candidate motion vectors are half pel motion vectors or the seed motion vector is a half pel motion vector and the candidate motion vectors are quarter pel motion vectors.

20. At least one non-transitory machine readable medium comprising a plurality of instructions that, in response to being executed on a computing device, cause the computing device to provide motion estimation by:
determining a seed motion vector of a pixel block;
dividing the pixel block into a plurality of regions, wherein the seed motion vector is based on the whole pixel block rather than a single region;
generating a distortion mesh for the pixel block, wherein the distortion mesh comprises a plurality of distortion values wherein individual distortion values are each associated with one of the plurality of regions, the seed motion vector, and one of a plurality of candidate motion vectors associated with the seed motion vector, the generating comprising using the seed motion vector with each call to generate the distortion values; and determining a best motion vector for the whole pixel block based on the distortion mesh, wherein determining the best motion vector comprises determining a minimum distortion summation value from a plurality of distortion summation values, wherein each of the distortion summation values is associated with a candidate motion vector of the plurality of candidate motion vectors or the seed motion vector.

21. The machine readable medium of claim 20, wherein generating the distortion mesh comprises disabling a subset of pixels of a first region of the plurality of regions and based on a first pixel region mask associated with the first region.

22. The machine readable medium of claim 20, wherein generating the distortion mesh comprises a plurality of calls to a block based motion estimation engine, and wherein each of the plurality of calls comprises the seed motion vector.

23. The machine readable medium of claim 20, the machine readable medium comprising further instructions that, in response to being executed on a computing device, cause the computing device to provide motion estimation by:

generating a second distortion mesh for the pixel block, wherein the second distortion mesh comprises a plurality of second distortion values associated with the plurality of regions, the best motion vector, and a plurality of second candidate motion vectors associated with the best motion vector; and determining an enhanced resolution best motion vector for the whole pixel block based on the second distortion mesh.

* * * * *